United States Patent
Chao (10) Patent No.: US 9,904,376 B2
(45) Date of Patent: Feb. 27, 2018

(54) COMPUTER MOUSE WITH AN ADJUSTABLE PALM REST

(71) Applicants: DEXIN ELECTRONIC LTD., Donggaun, Guangdong (CN); DEXIN CORPORATION, New Taipei (TW)

(72) Inventor: Pan-Chun Chao, New Taipei (TW)

(73) Assignees: DEXIN ELECTRONIC LTD., Dongguan, Guangdong (CN); DEXIN CORPORATION, New Taipei (TW)

( * ) Notice: Subject to any disclaimer, the term of this patent is extended or adjusted under 35 U.S.C. 154(b) by 68 days.

(21) Appl. No.: 15/206,245

(22) Filed: Jul. 9, 2016

(65) Prior Publication Data

US 2018/0011558 A1    Jan. 11, 2018

(51) Int. Cl.
G06F 3/033 (2013.01)
G06F 3/0354 (2013.01)

(52) U.S. Cl.
CPC .......... G06F 3/03543 (2013.01); *G06F 3/033* (2013.01); *G06F 2203/0332* (2013.01)

(58) Field of Classification Search
USPC ............................ 345/163, 156, 157; 463/37
See application file for complete search history.

(56) References Cited

U.S. PATENT DOCUMENTS

| 5,912,661 | A   | * | 6/1999  | Siddiqui | G01D 5/2451 345/157 |
| 2004/0178990 | A1 | * | 9/2004  | Hsu      | G06F 3/03543 345/163 |
| 2008/0129693 | A1 | * | 6/2008  | Chen     | G06F 3/03543 345/157 |
| 2011/0227828 | A1 | * | 9/2011  | Blandin  | G06F 3/03543 345/163 |
| 2015/0109208 | A1 | * | 4/2015  | Wang     | G06F 3/03543 345/163 |
| 2015/0138093 | A1 | * | 5/2015  | Young    | G06F 3/0312 345/166 |
| 2015/0286296 | A1 | * | 10/2015 | Wang     | G06F 3/03543 345/163 |

* cited by examiner

*Primary Examiner* — Jennifer Mehmood
*Assistant Examiner* — Sosina Abebe
(74) *Attorney, Agent, or Firm* — Li & Cai Intellectual Property (USA) Office (57) ABSTRACT

A computer mouse with an adjustable palm rest includes a main housing defined with a longitudinal direction and a traverse direction and has a carriage. A connecting base is rotatably connected to the carriage along a first axis. A supporting casing has a front wall and a rear wall. A palm-resting cover is fixed to the supporting casing. The front wall is closed to the connecting base. The supporting casing is rotatably connected to the connecting base along a second axis. The supporting casing can be arranged at different oblique angles related to the connecting base. A positioner chain is formed on a surface of the connecting base or the supporting casing and has a plurality of positioning dimples. A positioning assembly abuts against one of the dimples and retains the supporting casing at one of the oblique angles related to the connecting base.

10 Claims, 11 Drawing Sheets

COMPUTER MOUSE WITH AN ADJUSTABLE PALM REST

BACKGROUND OF THE INVENTION

1. Field of the Invention

The present disclosure is related to a computer mouse with an adjustable palm rest. In particular, the present disclosure relates to a computer mouse for controlling a cursor of computer, the computer mouse having a palm rest, which is adjustable to change an inclined angle thereof.

2. Description of Related Art

The computer mouse as an inputting device is widely used to control a cursor of computer. The universal configuration of the computer mouse is usually designed as a symmetrical structure in relation to the left side and right side, so as to be held in the right hand or left hand. However, an individual's strong hand has a different shape and size. When using a computer mouse, the user is unavoidably forced to use a fixed configuration of the computer mouse in an uncomfortable holding posture. As times passes, it is easily to injure the hand and wrist.

Therefore, a computer mouse overcoming the above-mentioned problems is proposed.

SUMMARY OF THE INVENTION

It is one objective of this invention to provide a computer mouse with an adjustable palm rest, to improve the shortcoming of the universal-type computer mouse which cannot completely adapt to a right handed user and a left handed user, and provide an adjustable palm rest with a changeable inclined angle, so that both the right handed user and left handed user can comfortably dispose their palm on the computer mouse.

In order to achieve the above objectives, one embodiment according to the present disclosure provides a computer mouse with an adjustable palm rest, which includes a main body. The main body is defined with a longitudinal direction and a traverse direction. The main body has a carriage. A connecting base is rotatably connected to the carriage along a first axis parallel to the traverse direction. A supporting casing has a front wall and a rear wall connected to the front wall, and the front wall is closed to the connecting base. The supporting casing is rotatably connected to the connecting base along a second axis perpendicular to the traverse direction. The supporting casing is selectively arranged at one of a plurality of inclined positions related to the connecting base. The connecting base or the supporting casing has a positioner chain formed on a surface thereof. The positioner chain has a plurality of positioning dimples. An orientation module is abutted against one of the positioning dimples, fixing the supporting casing at one of the inclined positions related to the connecting base. A palm-resting cover is fixed to the supporting casing.

Thus, the present disclosure has advantages as follows. The computer mouse with an adjustable palm rest of this present disclosure can be adjusted to an inclined angle of the palm rest, which is suitable to a right handed user and left handed user.

For further understanding of the present disclosure, reference is made to the following detailed description illustrating the embodiments and examples of the present disclosure. The description is for illustrative purpose only and is not intended to limit the scope of the claim.

DETAILED DESCRIPTION OF THE PREFERRED EMBODIMENTS

The aforementioned illustrations and following detailed descriptions are exemplary for the purpose of further explaining the scope of the present disclosure. Other objectives and advantages related to the present disclosure will be illustrated in the subsequent descriptions and appended drawings.

Figure 1:
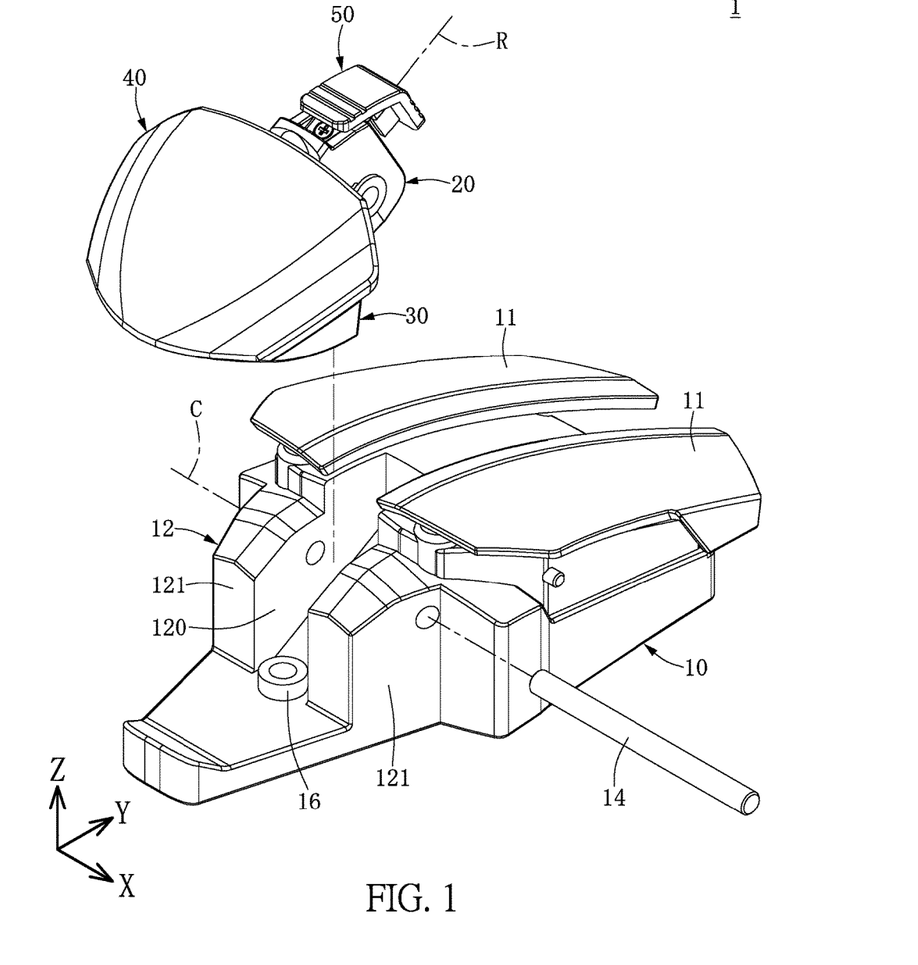
FIG. 1 is a perspective exploded view of computer mouse with an adjustable palm rest of the present disclosure.

Please refer to FIG. 1, which is a perspective exploded view of computer mouse with an adjustable palm rest of the present disclosure. This present disclosure provides a computer mouse with an adjustable palm rest 1 (or a computer mouse hereafter), which includes a main body 10, a connecting base 20, a supporting casing 30, a palm-resting cover 40 fixed on the supporting casing 30, and an orientation module (such as element 50). The connecting base 20, the supporting casing 30, the palm-resting cover 40 and the orientation module 50 are jointly configured as an adjustable palm-rest mechanism. The main body 10 further has an adjusting hole 16 in a perpendicular direction, and an adjusting element, such as a screw, can be used to abut against a bottom surface of the supporting casing 30 to adjust a height of the supporting casing 30.

The main body 10 is defined with a longitudinal direction (the Y axis shown in the coordinates) and a traverse direction (the X axis shown in the coordinates). For convenient description, in this embodiment one end of the computer mouse 1 having keys 11 is designated as a front end, and the other end for resting the palm is designated as a rear end. The longitudinal direction means a direction from the rear end toward the front end. The main body 10 has a carriage 12. The connecting base 20 is rotatably connected to the carriage 12 along a first axis C parallel to the traverse direction (the X axis shown in the coordinates).

The connecting base 20 in this embodiment has an upper seat 21 and a lower seat 22. The lower seat 22 is connected with an end of the upper seat 21, and both are configured in an L shape. The upper seat 21 is formed with a pivotal hole 210, an axial passage 25, and an upper accommodating tube 27. The axial passage 25 and the upper accommodating tube 27 are toward the supporting casing 30. A front end of the upper seat 21 is formed with a rod inlet 252 corresponding to the axial passage 25.

Figure 2:
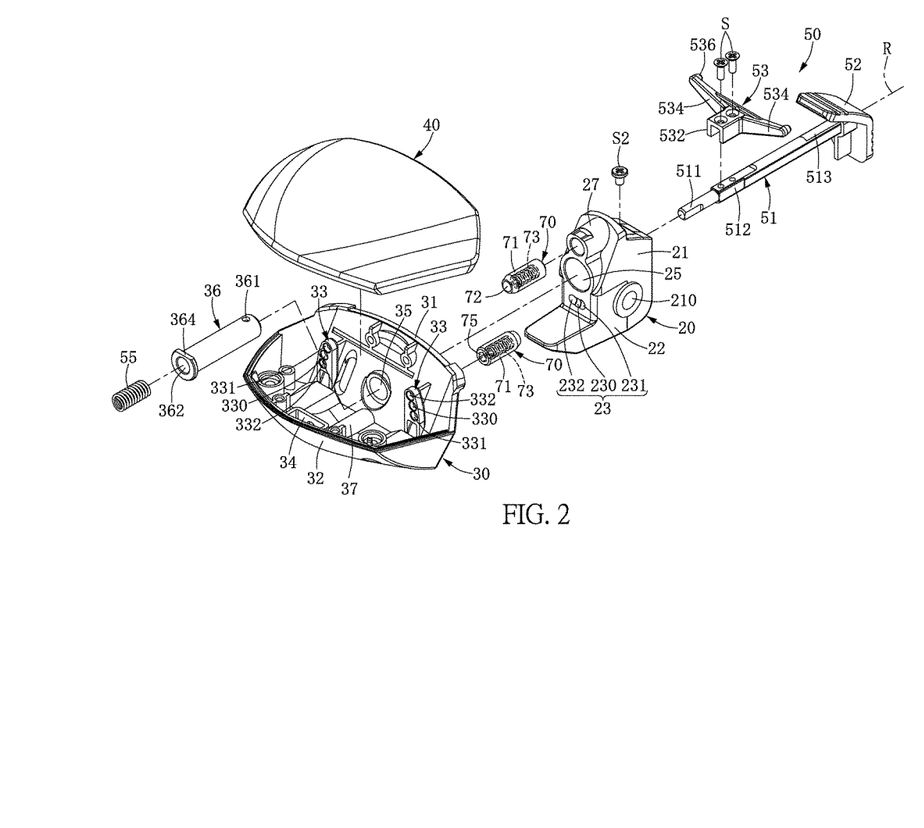
FIG. 2 is a perspective exploded view of adjustable palm-resting mechanism of the present disclosure.
Figure 3:
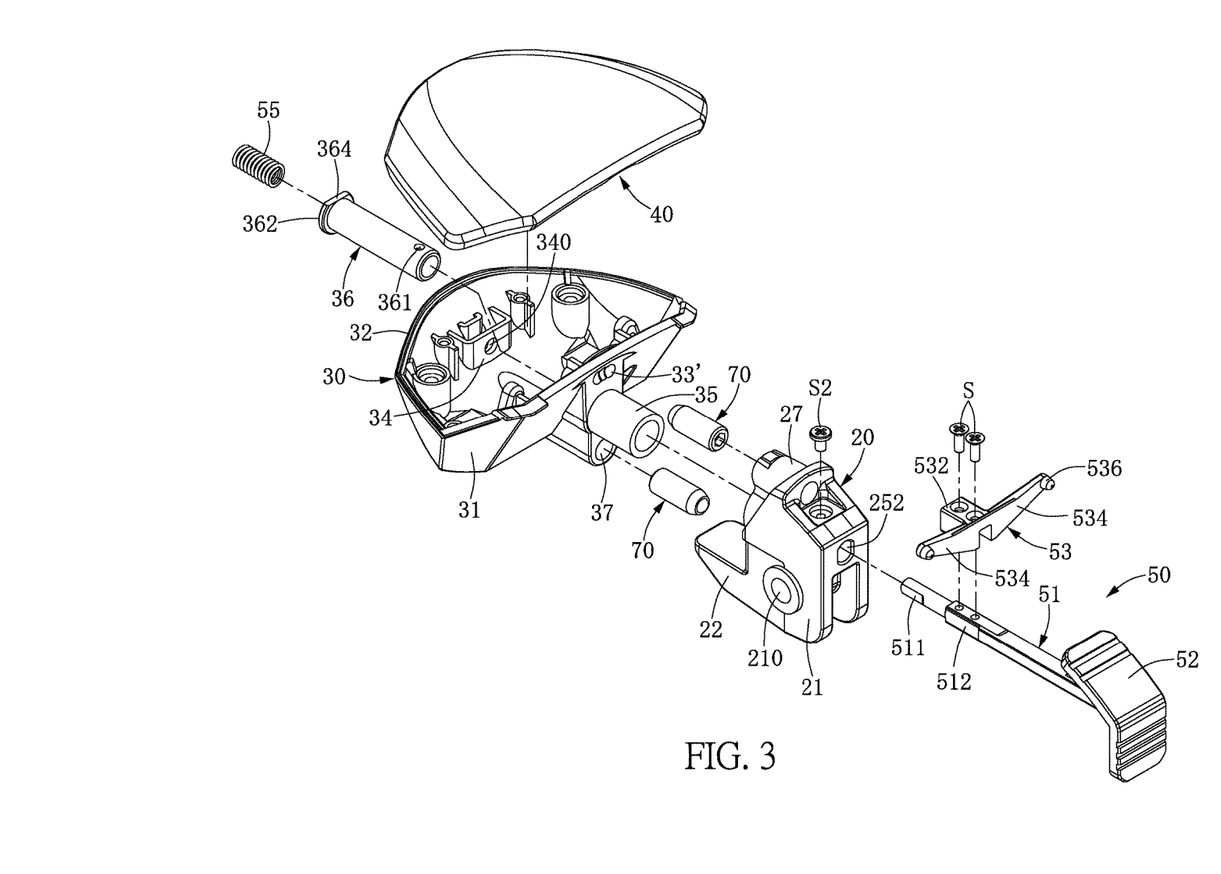
FIG. 3 is a perspective exploded view of adjustable palm-resting mechanism of the present disclosure.

Please refer to FIG. 1 to FIG. 3. FIG. 2 and FIG. 3 are exploded perspective views of the adjustable palm-resting mechanism of this present disclosure. The supporting casing 30 is pivotally connected to the connecting base 20 along a second axis R which is perpendicular to the traverse direction. The supporting casing 30 can be arranged in different inclined positions related to the connecting base 20, so that the palm-resting cover 40 is adjusted to a required inclined angle.

To fix the supporting casing 30 after adjusting an angle of the palm-resting cover 40, this embodiment has a plurality of orientation modules (such as elements 50 and 70 in FIGS. 2 and 3) and as positioner chain (such as elements 23 and 33 in FIG. 2 and element 33' in FIG. 3) formed on the connecting base 20 and the supporting casing 30. The positioner chain can be formed on a surface of the connecting base 20 or a surface of the supporting casing 30. Alternatively, as shown in FIG. 2 of this embodiment, the connecting base 20 is formed with a positioner chain 23 facing the supporting casing 30. The supporting casing 30 has a front wall 31 which is formed with a positioner chain 33. As shown in FIG. 3, the supporting casing 30 has a surface facing the connecting base 20, which is formed with a positioner chain 33'.

Figure 4:
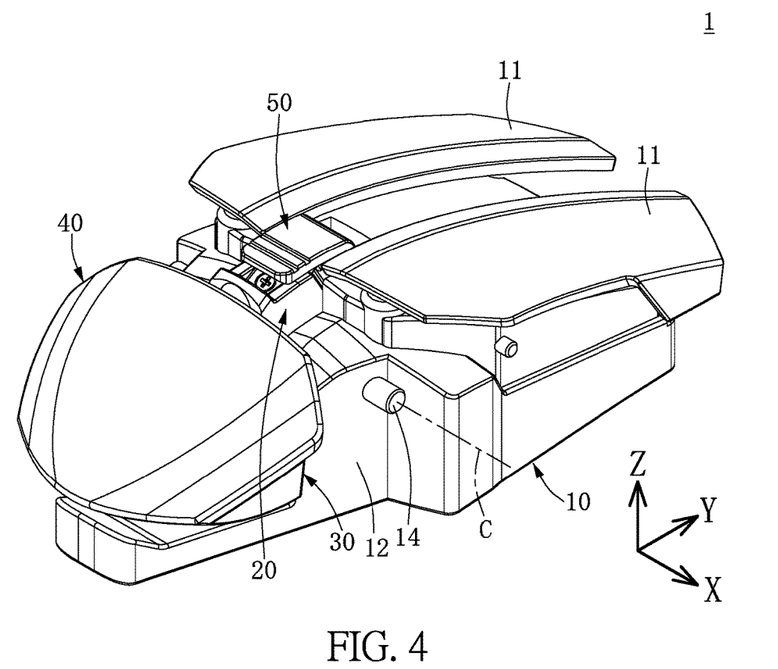
FIG. 4 is a perspective assembled view of computer mouse with an adjustable palm rest of the present disclosure.
Figure 5:
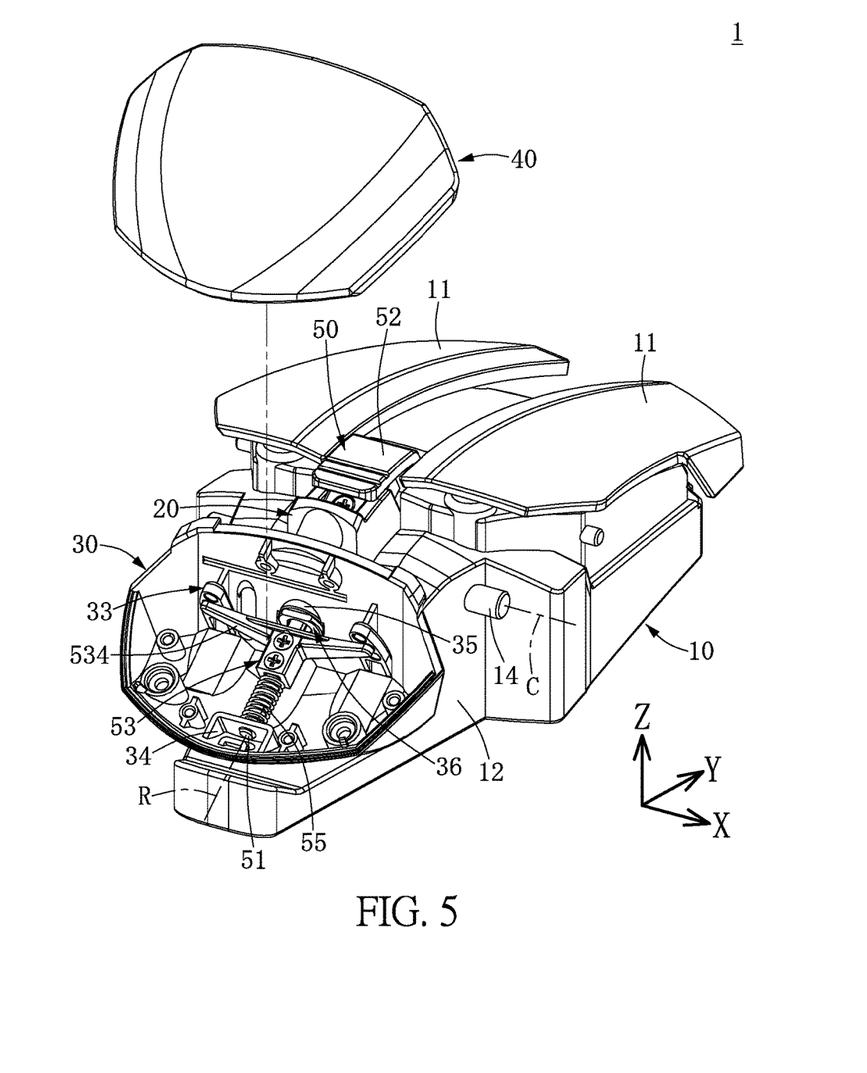
FIG. 5 is a perspective assembled view of computer mouse in a locking status (palm-resting cover is hidden) of the present disclosure.

Refer to FIG. 3, FIG. 4 and FIG. 5 showing assembled views of this embodiment. FIG. 5 is a perspective view of the computer mouse removing the palm-resting cover 40. The orientation module (the element 70 shown in FIG. 3) is abutted against the positioning dimples of the positioner chain 33, so as to fix the supporting casing 30 at one of the inclined positions related to the connecting base 20. Therefore, the computer mouse can be adjusted to adapt the user's palm according to user's habit in order to fulfill ergonomics requirements. For example, right-handed user is slightly inclined right, left-handed is slightly inclined left. The above elements will be introduced in detail as follows.

Please refer to FIG. 1, FIG. 2 and FIG. 5. The carriage 12 of the main body 10 has a pair of bearing hubs 121, and a receiving space 120 which is formed between the pair of bearing hubs 121. The connecting base 20 is disposed in the receiving space 120. This embodiment has a traverse axle 14 arranged along the first axis. The traverse axle 14 passes through the carriage 12 and the pivotal hole 210 of the connecting base 20. The connecting base 20 is pivotally connected to the carriage 12 along the first axis C in the traverse direction (shown as the X axis).

The supporting casing 30 includes a front wall 31 and a rear wall 32 connected with the front wall 31. The front wall 31 is adjacent to the connecting base 20. The supporting casing 30 further includes an axial tube 35 integrally protruded from the front wall 31 toward the connecting base 20, and a lower accommodating tube 37 located under the axial tube 35. The axial tube 35 is disposed in the axial passage 25 of the connecting base 20, therefore the supporting casing 30 can be rotated relative to the connecting base 20 along a direction of the axial tube 35 for adjusting the angle.

In this embodiment, to combine the supporting casing 30 with the connecting base 20, the supporting casing 30 further includes a linking sleeve 36 passing through the axial tube 35 of the supporting casing 30. The linking sleeve 36 has a head end (adjacent the element 361) and a distal end, which is hollow shaped. The head end of the linking sleeve 36 is extended beyond the axial tube 35 and extended into the connecting base 20 and fixed to the connecting base 20. The distal end of the linking sleeve 36 is abutted against one side of the front wall 31. Thus, the supporting casing 30 is connected to the connecting base 20 and keeps it from disengaging. In this embodiment, the head end of the linking sleeve 36 is formed with a locking hole 361. The distal end of the linking sleeve 36 is formed with a retaining wall 362. The connecting base 20 is fixedly screwed in the locking hole 361 of the linking sleeve 36 by a fixing screw S2. The retaining wall 362 is formed with a flat leveled-shaped identification part 364. The position of the identification part 364 is corresponding to the locking hole 361, so that it is conveniently to orient the fixing screw S2 during assembling.

Please refer to FIG. 2 and FIG. 3. The orientation module of this embodiment can be a locking-type orientation module 50, which is able to operate and lock. The locking-type orientation module 50 includes a controlling rod 51, a pressing cap 52, a locking unit 53 and a spring 55. The pressing cap 52 is opposite to the supporting casing 30, and is disposed at one side of the connecting base 20. The controlling rod 51 passes through the connecting base 20 and the linking sleeve 36 from the rod inlet 252 of the connecting base 20 (as shown in FIG. 2). The controlling rod 51 has one end which is connected to the pressing cap 52, and the other end which is extended into the supporting casing 30 and close to the rear wall 32 of the supporting casing 30.

The locking unit 53 is disposed in the supporting casing 30, and is fixed to the controlling rod 51. The supporting casing 30 is formed with a positioner chain 33 toward the locking unit 53. The positioner chain 33 of this embodiment has three positioning dimples 330, 331, 332. The locking unit 53 has one end which inserts into one of the positioning dimples (330, 331, and 332) of the positioner chain 33.

The spring 55 provides the locking unit 53 with a force toward the connecting base 20, so that the locking unit 53 is normally fixed to the positioner chain 33. The spring 55 of this embodiment is an extension spring, but is not limited thereto.

The locking unit 53 has an attaching part 532 and a pair of locking arms 534. The pair of locking arms 534 is connected to two sides of the attaching part 532. The controlling rod 51 has a mounting section 512. The attaching part 532 is fixedly screwed to the mounting section 512 of the controlling rod 51 by a screw S. The supporting casing 30 has a pair of positioner chains 33. The pair of positioner chains 33 is respectively corresponding to the pair of locking arms 534. Each positioner chain 33 is formed with a plurality of positioning dimples (such as 330, 331, and 332). In a preferable embodiment, each positioner chain 33 has three positioning dimples. The positioning dimple 331 is matched with a right-inclined position or angle. The positioning dimple 330 is matched with a horizontal position or angle. The positioning dimple 332 is matched with a left-inclined position or angle. Each locking arm 534 has a distal end which is formed with a protrusion 536. The protrusion 536 is inserted one of the positioning dimples 330, 331, or 332.

The controlling rod 51 has a retaining section 513 which is slightly concaved. The fixing screw S2 passes through the locking hole 361 of the linking sleeve 36, and is abutted against the retaining section 513.

The supporting casing 30 has an axial seat 34 which is substantially U-shaped. The axial seat 34 is formed with an axle hole 340. The controlling rod 51 has a free end 511, and the free end 511 penetrates into the axle hole 340 of the axial seat 34. The spring 55 is sheathed on the controlling rod 51, and two ends of the spring 55 respectively contact the axial seat 34 and the locking unit 53.

Please refer to FIG. 2 and FIG. 3. This embodiment further provides anther kind of orientation module. The orientation module can be a packing-type orientation module 70, so that the supporting casing 30 is forced against the connecting base 20, or the connecting base 20 is forced against the supporting casing 30. Alternatively, as shown in this embodiment, both are tightly pressed against each other. Since the packing-type orientation module 70 has a ball 72 which is elastically movable by an elasticity force, the ball 72 is able to press against the positioner chain. In this embodiment, the packing-type orientation module 70 has a cylinder 71, and the ball 72 is received in a front end of the cylinder 71. The spring 73 is installed in the cylinder 71, and a distal part 75 is fixed at a rear end of the cylinder 71. The distal part 75 can be a hexagonal screw. The supporting casing 30 has one packing-type orientation module 70 installed in the lower accommodating tube 37 and toward the connecting base 20. The connecting base 20 has one positioner chain 23 which faces the supporting casing 30. The connecting base 20 has one packing-type orientation module 70 which is installed in the upper accommodating tube 27 and toward the supporting casing 30. The supporting casing 30 is formed with one positioner chain 33', which faces the connecting base 20. The ball 72 is pressed against the positioner chain (23, 33').

Figure 5A:
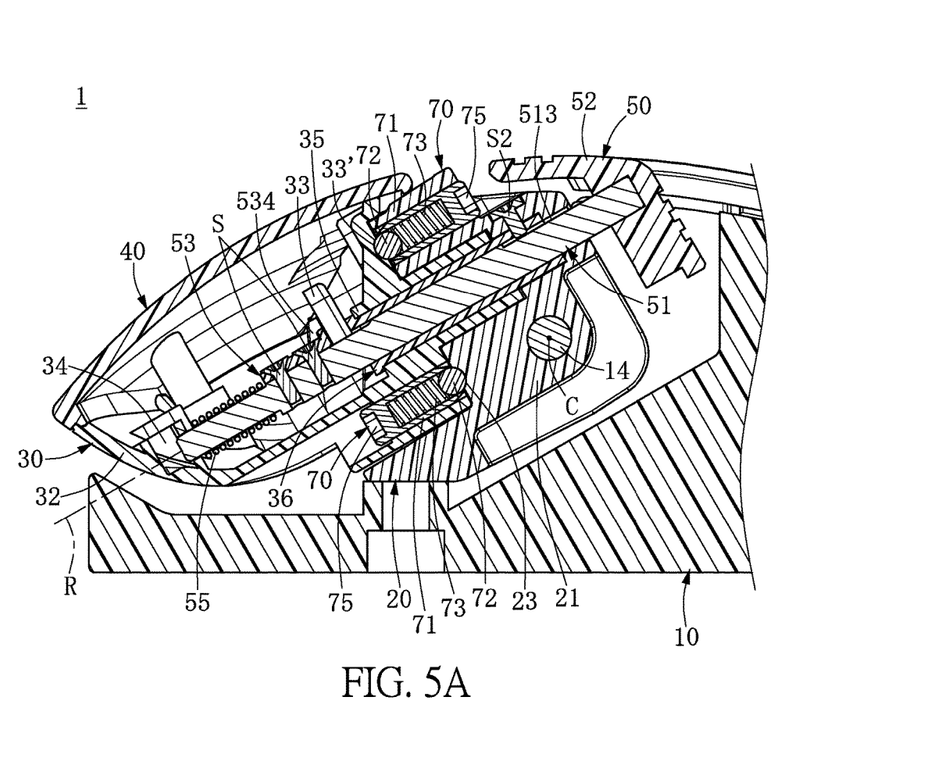
FIG. 5A is a central cross-sectional view of computer mouse in a unlocking status along a longitudinal direction of the present disclosure.

Please refer to FIG. 5 and FIG. 5A. FIG. 5 is a perspective view of the computer mouse in a locked condition and the supporting casing, arranged in a horizontal condition, of the instant disclosure. FIG. 5A is a cross-sectional view of the computer mouse along a longitudinal direction at a central position. Regarding a normal condition of the computer mouse 1, the locking-type orientation module 50 is locked by an elasticity force of the spring 55, and the locking unit 53 is positioned to the positioner chain 33.

Figure 6:
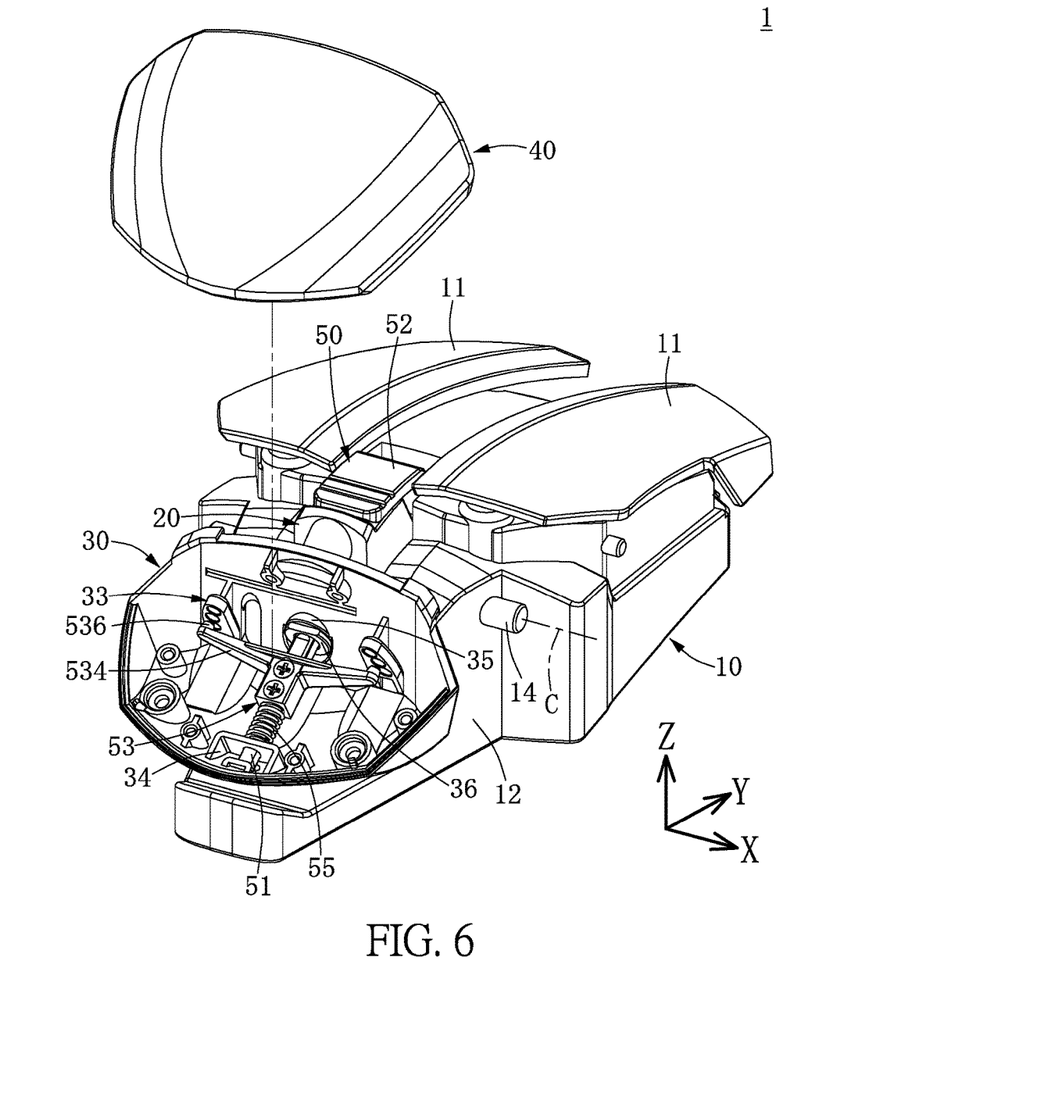
FIG. 6 is a perspective assembled view of computer mouse in an unlocking status (palm-resting cover is hidden) of the present disclosure.
Figure 6A:
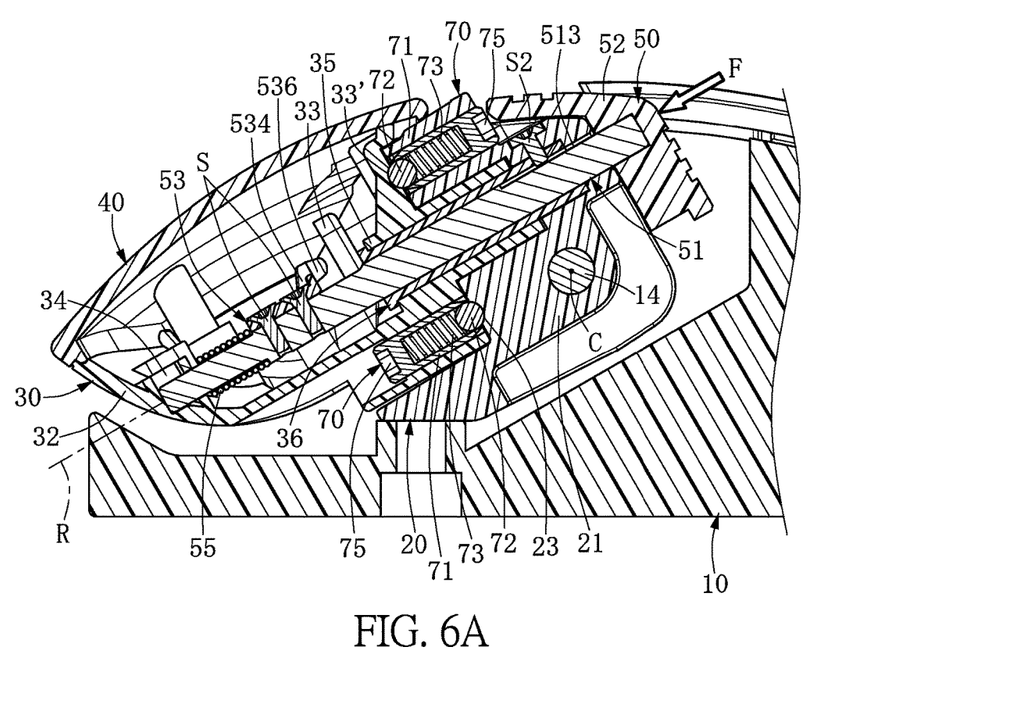
FIG. 6A is a central cross-sectional view of computer mouse in unlocking status along a longitudinal direction of the present disclosure.

To adjust the angle of the palm rest, as shown in FIG. 6 and FIG. 6A, a user first presses the pressing cap 52 of the locking-type orientation module 50, referring to the arrow F as shown in FIG. 6A, so that the controlling rod 51 can move backward. The locking unit 53 is moved away from the positioner chain 33. In the meantime, the supporting casing 30 is able to rotate right or left along the controlling rod 51 relative to the connecting base 20.

Figure 7:
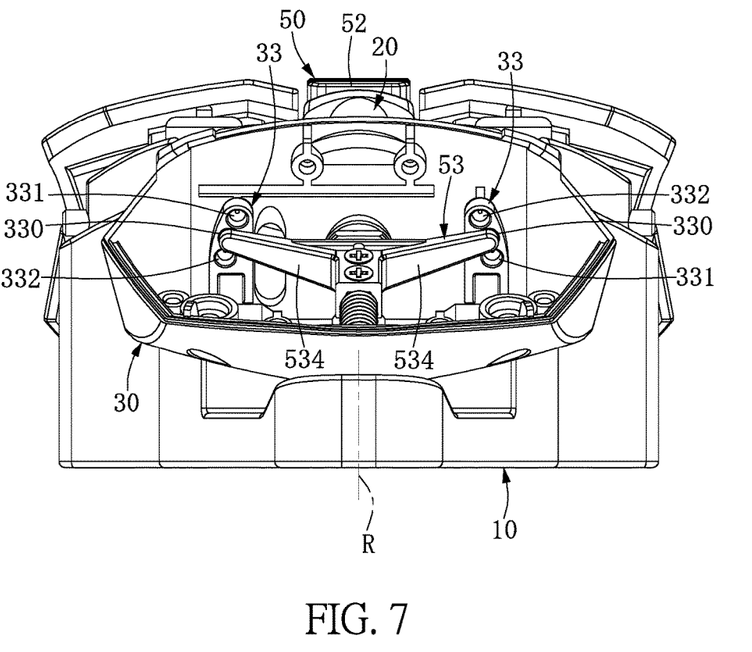
FIG. 7 is a rear view of supporting casing in a horizontal status (palm-resting cover is hidden) of the present disclosure.
Figure 8:
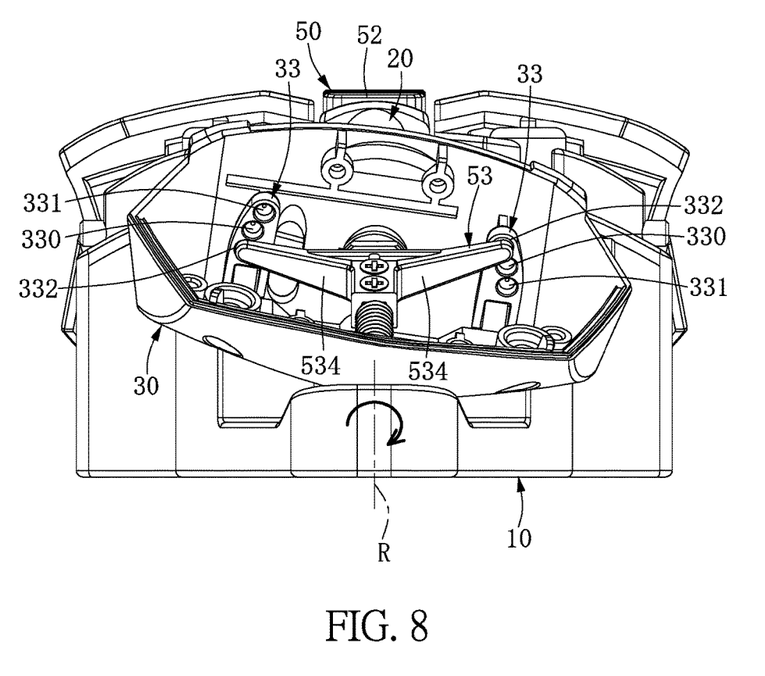
FIG. 8 is a rear view of a supporting casing (palm-resting cover is hidden) in a right-inclined condition of the present disclosure.
Figure 9:
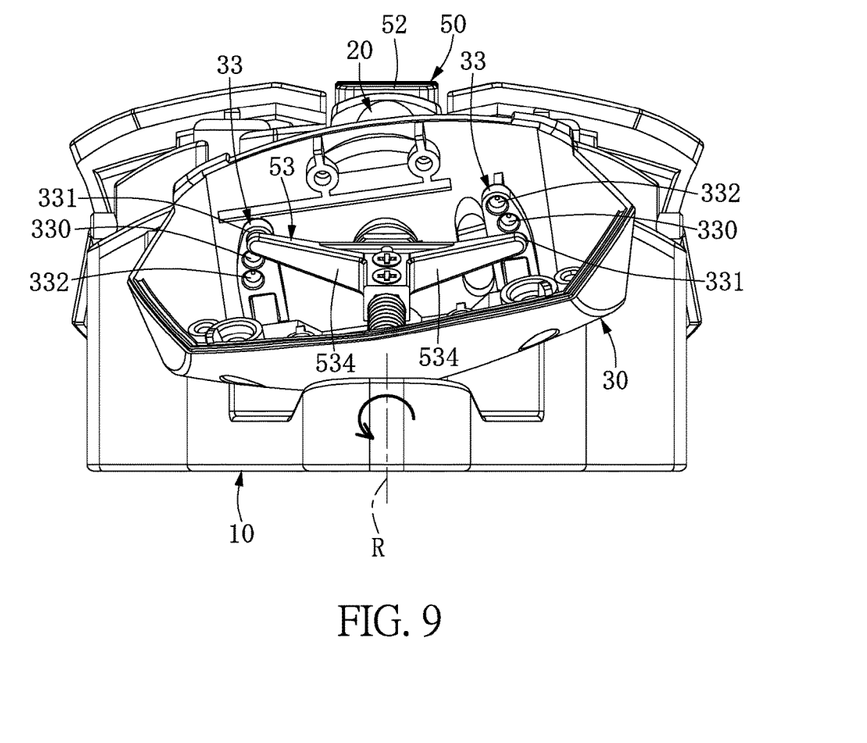
FIG. 9 is a rear view of supporting casing (palm-resting cover is hidden) in a left-inclined condition of the present disclosure.

As shown in FIG. 7, a rear view of the computer mouse is shown without the palm-resting cover. The supporting casing of the computer mouse can be arranged in a horizontal condition; meanwhile, the locking unit 53 is positioned at the positioning dimples 330 of the positioner chain 33. As shown in FIG. 8, wherein the palm-resting cover is removed, in an optional manner, the supporting casing of the computer mouse can be arranged in a right-inclined condition; the locking unit 53 is positioned at the positioning dimples 332 of the positioner chain 33. As shown in FIG. 9, wherein the palm-resting cover is removed, in a further optional manner, the supporting casing of the computer mouse can be arranged in a left-inclined condition; the locking unit 53 is positioned at the positioning dimples 331 of the positioner chain 33.

A supplementary note, by the linking sleeve 36 and the packing-type orientation module 70, the supporting casing 30 normally is pressed against the connecting base 20. When the supporting casing 30 is rotating, the packing-type orientation module 70 is able to move between the positioning dimples 230, 231, 232 along the positioner chain 23, so as to provide an operation feel of tactile feedback.

To sum up, this present disclosure has features and functions of the computer mouse with an adjustable palm rest, and the angle of the palm rest is adjustable, so that it is adaptable to both a right-handed user and a left-handed user.

The descriptions illustrated supra set forth simply the preferred embodiments of the present disclosure; however, the characteristics of the present disclosure are by no means restricted thereto. All changes, alterations, or modifications conveniently considered by those skilled in the art are deemed to be encompassed within the scope of the present disclosure delineated by the following claims.

What is claimed is:

1. A computer mouse with an adjustable palm rest, comprising:
    a main body, defining a longitudinal direction and a traverse direction, the main body having a carriage;
    a connecting base, rotatably connected to the carriage along a first axis parallel to the traverse direction;
    a supporting casing, having a front wall and a rear wall connected to the front wall, the front wall close to the connecting base, wherein the supporting casing is rotatably connected to the connecting base along a second axis perpendicular to the traverse direction, the supporting casing being selectively arranged at one of a plurality of inclined positions related to the connecting base;
    wherein the connecting base or the supporting casing has a positioner chain formed on a surface thereof, the positioner chain has a plurality of positioning dimples;
    an orientation module, abutted against one of the positioning dimples, and fixing the supporting casing at one of the inclined positions related to the connecting base; and
    a palm-resting cover, fixed to the supporting casing.

2. The computer mouse with an adjustable palm rest as claimed in claim 1, wherein the carriage of the main body has a pair of bearing hubs, and a receiving space formed between the pair of bearing hubs, the connecting base is disposed in the receiving space, wherein the computer mouse further has a traverse axle arranged along the first axis, the traverse axle passes through the carriage and the connecting base.

3. The computer mouse with an adjustable palm rest as claimed in claim 1, wherein the supporting casing has an axial tube integrally protruded from the front wall toward the connecting base, the connecting base formed with an axial passage, the axial tube is disposed in the axial passage; wherein the supporting casing further includes a linking sleeve passing through the axial tube of the supporting casing, the linking sleeve has a head end and a tail end, the head end extending over the axial tube and extending into the connecting base and fixed to the connecting base, the tail end connected to one side of the front wall.

4. The computer mouse with an adjustable palm rest as claimed in claim 3, wherein the head end of the linking sleeve is formed with a locking hole, the tail end is formed with a retaining wall, and the retaining wall is formed with an identification part, wherein a position of the identification part is aligned with the locking hole, the connecting base is screwed to the locking hole of the linking sleeve by a fixing screw.

5. The computer mouse with an adjustable palm rest as claimed in claim 3, wherein the orientation module is a locking-type orientation module, and the locking-type orientation module includes:
- a pressing cap, disposed at one side of the connecting base opposite to the supporting casing;
- a controlling rod, passing through the connecting base and the linking sleeve, wherein the controlling rod has one end connected to the pressing cap, and another end extended into an inner side of the supporting casing;
- a locking unit, positioned in the supporting casing, and fixed to the controlling rod; wherein the supporting casing is formed with the positioner chain toward the locking unit, the locking unit has at least one end inserted in one of the positioning dimples of the positioner chain; and
- a spring, providing the locking unit an elastic force toward the connecting base, the locking unit normally being fixed on the positioner chain.

6. The computer mouse with an adjustable palm rest as claimed in claim 5, wherein the locking unit has an attaching part, and a pair of locking arms respectively connected to two sides of the attaching part, the supporting casing is formed with a pair of the positioner chains, the pair of positioner chains are corresponding to the pair of locking arms respectively, each of the locking arms has a protrusion formed at a distal end thereof, the protrusion is inserted in the positioner chain.

7. The computer mouse with an adjustable palm rest as claimed in claim 5, wherein the controlling rod includes a retaining section, wherein the fixing screw is passed through the locking hole of the linking sleeve, and abutted against the retaining section.

8. The computer mouse with an adjustable palm rest as claimed in claim 5, wherein the supporting casing has an axial seat, the axial seat is formed with an axle hole; wherein the controlling rod has a free end, the free end inserted in the axle hole of the axial seat, the spring is put around the controlling rod, and the spring are abutted against the axial seat and the locking unit respectively.

9. The computer mouse with an adjustable palm rest as claimed in claim 1, wherein the orientation module is a packing-type orientation module, the packing-type orientation module has a ball being movable elastically, wherein the supporting casing is mounted with one of the packing-type orientation module toward the connecting base, the connecting base is formed with the positioner chain toward the supporting casing; wherein the connecting base is mounted with one of the packing-type orientation module toward the supporting casing, the supporting casing is formed with the positioner chain toward the connecting base, wherein the ball is tightly abutted against the positioner chain.

10. The computer mouse with an adjustable palm rest as claimed in claim 9, wherein the packing-type orientation module includes a cylinder, a spring received in the cylinder, and a distal part fixed to a rear end of the cylinder, wherein the ball is received in a front end of the cylinder.

* * * * *